United States Patent Office 3,527,432
Patented Sept. 8, 1970

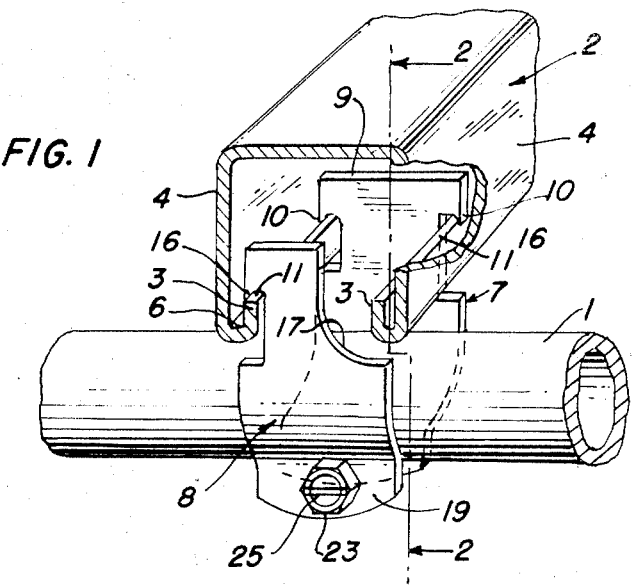
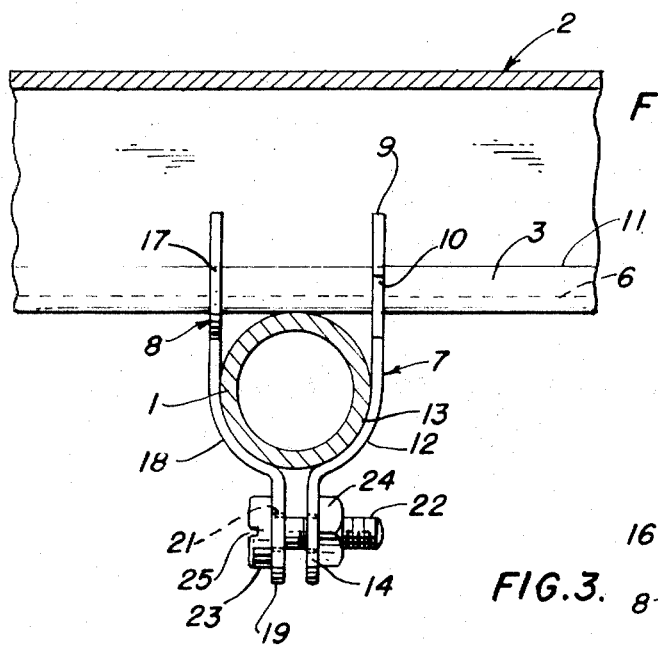
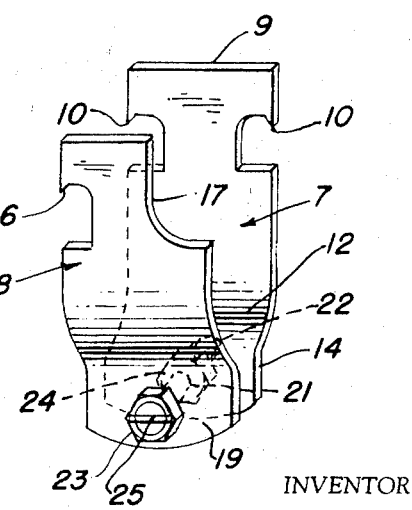

3,527,432
PIPE OR TUBING SUPPORT
Walter W. Lytle, San Francisco, Calif., assignor to Superior Strut & Hanger Co. Inc., a corporation of California
Filed June 3, 1968, Ser. No. 734,038
Int. Cl. F16l 3/10
U.S. Cl. 248—62                                    2 Claims

ABSTRACT OF THE DISCLOSURE

A pair of complementary clamping plates, each plate curved near one end to accommodate pipe or tubing, and hooks on the edges at the other end to hook into inturned flanges in a supporting channel, thereby to clamp the pipe or tubing to the supporting channel; the ends adjacent to the curved portions of the clamping plates being formed into parallel flanges with registering holes to accommodate a threaded fastening element whereby the clamping plates can be tightened onto the pipe; one of the clamping plates is provided with two opposite hanging hooks on opposite edges, the other plate being provided with one hanging hook so as to facilitate the insertion of the pre-assembled complementary plates over the pipe and into engagement with the inturned flanges of the channel.

BACKGROUND OF THE INVENTION

Various types of hangers have been provided in the past for hanging or clamping pipes or tubes to a channel having longitudinal retaining flanges. In several forms spring arms were provided in the form of spring clips to be inserted between retaining flanges and then be allowed to snap into engagement with the flanges. There were also some form of engagement ears on clamping plates, but in previous forms the person installing the pipe had to carefully assemble the clamping elements over the pipe and watch that they are firmly engaged with the retaining flanges. In the herein invention the plates can be easily inserted over the pipe although the fastening screw is assembled in the free ends of the clamping plates so that the fastening screw can be manipulated after the plates embrace the pipe and are hooked into the inturned flanges of the channel.

DESCRIPTION OF FIGURES

FIG. 1 is a perspective view showing the hanging plates in assembled position on a pipe.

FIG. 2 is an edge view of the plates with the pipe and the channel being shown in section.

FIG. 3 is a perspective detailed view of the plates disassembled.

DETAILED DESCRIPTION

Usually a tubing or pipe 1 is hung on or clamped to a generally U-shaped channel 2, which is intended for use as a structural member. The free longitudinal edges of the channel 2 are turned inwardly and the extreme edges of the turned edges are again turned inwardly so as to produce inturned longitudinal flanges 3 spaced from the side walls 4 of the channel 2, thereby forming a longitudinal slot along each edge of the U-shaped channel 2.

The clamping device includes two complementary plates 7 and 8. Plate 7 has on each edge near its top 9 a hook 10. The top 9 and the portion of the plate 7 at and above the hook 10 is wider than the space between the inturned flanges 3 of the channel 2 so that the opposite hooks 10 thereof hook over the inside edges 11 of the respective flanges 3. The portion of the plate spaced below the hooks 10 is curved or dished so as to form a cradle 12 for embracing a portion of the periphery 13 of the pipe 1. The free end 14 of the plate 7 is formed into a securing flange parallel with the plane of the upper portion of the plate 7.

The plate 8 has a hook 16 on one edge only and is cut away at its other edge 17 so that it is narrower than the spacing between the inturned flanges 3 thereby to facilitate insertion. The lower middle portion of plate 8 is formed into a complementary curved cradle 18 to engage a portion of the outer periphery 13 of the pipe 1. The free end portion of the plate 8 terminates in a securing flange 19 opposite to and parallel with the securing flange 14. The securing flanges 14 and 19 have registering holes 21 through which is inserted a threaded securing element such as a bolt or screw 22, the slotted head 23 of which engages the securing flange 19 of plate 8. A nut 24 is tightened on the screw 22 against the other securing flange 14.

In operation the two plates are pre-assembled with the screw 22 in position and the nut 24 on the free end of the screw 22. The hooked ends of plates 7 and 8 are slipped over the pipe 1 and plate 7 is turned slightly for insertion between the inturned flanges 3. Then the plates are turned over the flanges 3 whereupon the hooks 10 of the plate 7 hook over the respective edges 11 of the inturned flanges 3. Attention has to be paid only to the hook 16 of the plate 8 so that it is over the adjacent inturned flange 3. Then the screw slot 25 of the set screw can be engaged and the screw turned to tightly pull together the securing flanges 14 and 19 for firm engagement of the plate cradles 12 and 18 with the opposite sides of the other circumference 13 of the pipe 1.

The clamping plates can be quickly and easily installed without need for aligning two opposite members with the inturned flanges 3 or slots 6. The plates are held pre-assembled by the said screw 22 for quick and positive insertion instead of the insertion of individual hangers, thus the need for manipulation of the individual hanging members is obviated.

The plate 8 on the side of the screw head 23 has a hook 10 only on one edge. The other plate has hooks 10 on opposite edges. These plates can be made stronger and the hooks heavier than in previous practice. The three point grip has a stabilizing effect and permits installation much faster than in previous structures.

The device is simple in structure and easily applicable by labor ordinarily available, and it accomplishes positive and firm hanging of pipes with considerable saving.

I claim:
1. In combination,
   (a) structural supporting element having a longitudinal slot,
   (b) inwardly projecting longitudinal flanges along the sides of said slot,
   (c) a pair of complemental pipe clamping plates,
   (d) a curved portion adjacent a free end of each plate for cradling about one-half of a pipe therein,
   (e) a hook formed on each edge of one plate hooking over the opposite inturned flanges, said plate being wider than the width of said slot,
   (f) a single hook on one edge only of the other plate hooking over only one of said inturned flanges, thereby to grip said flanges at three points,
   (g) the other edge of said other plate being cut away so that the hooked portion of said other plate extending through said slot is narrower than the width of said slot, and
   (h) manipulatable means to connect and tighten said free ends of said plates.

2. The invention defined in claim 1, said manipulatable means including
 (i) a threaded element extended through holes in the free ends of the plates,
 (j) means on said threaded element to engage and pull together said plates thereby to tighten said curved portion on the lower peripheral portions of a pipe.

References Cited

UNITED STATES PATENTS 2,846,169  8/1958  Sullivan _____ 248—62
2,863,625  12/1958  Attwood _____ 248—73 X
3,370,815  2/1968  Opperthauser _____ 248—68 X

FOREIGN PATENTS 165,805  2/1959  Sweden.

CHANCELLOR E. HARRIS, Primary Examiner

U.S. Cl. X.R.

248—71, 73